J. F. ISOM.
LEVEL DEVICE.
APPLICATION FILED DEC. 27, 1913. RENEWED AUG. 25, 1916.

1,221,738.

Patented Apr. 3, 1917.

Inventor
J. F. Isom.

Witnesses
W. P. Smith
Dudley B. Howard

By Victor J. Evans
Attorney

UNITED STATES PATENT OFFICE.

JOSEPH F. ISOM, OF AUGUSTA, GEORGIA.

LEVEL DEVICE.

1,221,738. Specification of Letters Patent. Patented Apr. 3, 1917.

Application filed December 27, 1913, Serial No. 809,011. Renewed August 25, 1916. Serial No. 116,936.

*To all whom it may concern:*

Be it known that I, JOSEPH F. ISOM, a citizen of the United States, residing at Augusta, in the county of Richmond and State of Georgia, have invented new and useful Improvements in Level Devices, of which the following is a specification.

This invention relates to carpenters' and bricklayers' levels, the primary object being to provide a level device which will be very accurate in use and is adapted to be attached readily to any straight edged stock, or the stock of the ordinary form of level for use thereon.

A further object of the invention is to provide a device of this character which may be used with equal accuracy in level and plumb work, and which has a compass associated therewith for use in obtaining latitude during the leveling operations.

A still further object is to provide a level device of the class described which is extremely simple in construction, which will be cheap in the cost of manufacture and easy to operate and which may be attached to or removed from the level stock with which it is to be used quickly and conveniently.

The invention consists in the features of construction, combination, and arrangement of parts, hereinafter fully described and claimed, reference being had to the accompanying drawing, in which:

Figure 1:
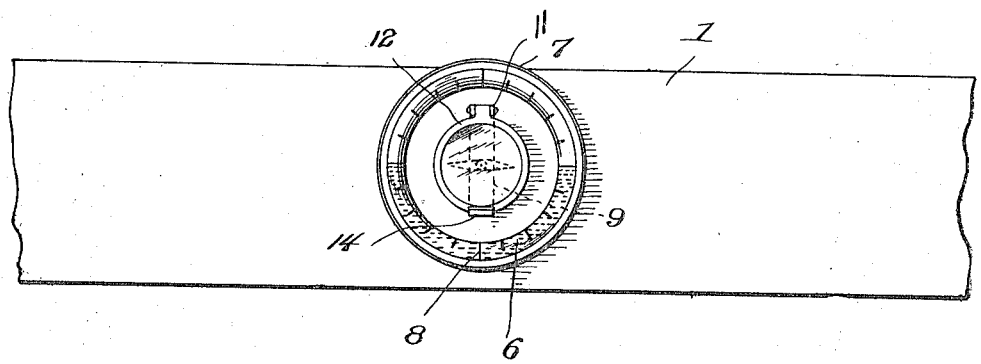
Figure 1 is a side elevation of a level stock of ordinary construction, showing the device of my invention mounted thereon, the compass being in its inoperative position.
Figure 2:
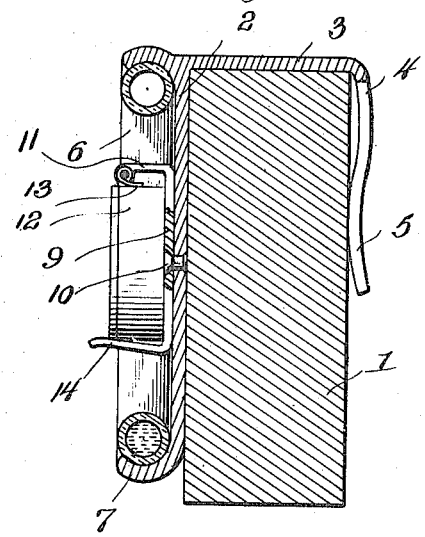
Fig. 2 is a transverse sectional view through the device.
Figure 3:
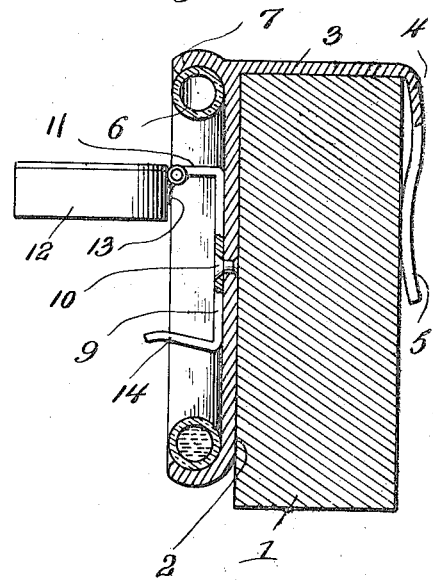
Fig. 3 is a similar view, showing the compass in its operative position.

In the drawing, the numeral 1 designates the stock of a well-known type of level upon which my improved level device is to be mounted. The flat, circular body 2 of the device is adapted to be positioned against one side face of the stock 1 with the horizontal portion 3 of an attaching member 4, which is connected with the body at the upper edge thereof overlying the top face of the stock. The attaching member is constructed of resilient material and its outer end portion 5 is bent downwardly to form a yieldable clip for secure engagement with the opposite side face of the stock. An annular tube 6 of glass or other transparent material is secured against the front face of the body 2 by means of the marginal flange 7 of the latter. This tube is adapted to be half-filled with a heavy liquid such as mercury, or the like, and the front face of the body is provided with a scale 8 which is exposed through the transparent tube and divides the same into quadrants and the quadrants into degrees. The diametrical lines which divide the scale into quadrants are disposed parallel to and at right angles to the longitudinal axis of the stock respectively, when the device is mounted thereon.

It should be apparent that this device may be used equally well in plumb and level work, or in obtaining the angular pitch or inclination of rafters and inclined surfaces.

In order that the device may be used in obtaining latitude in leveling operations, a compass-holding member 9 is pivoted medially upon the front face of the body 2 inward of the tube 6 for movement in a plane parallel to the said body by means of the pivot member 10. The member 9 is provided at its upper end with an outwardly extending arm 11 to which the compass casing 12 is connected by means of a hinged joint. A spring 13 is adapted normally to maintain the compass in its operative position disposed at right angles to the body, but the compass is adapted to be folded inwardly against the outer face of the holding member 9 when it is not desired for active use. An outwardly projecting resilient tongue 14 is provided upon the lower end of the member 9 for engagement with the compass casing 12, when in its inoperative position to secure the same therein.

Several methods by which the spirit tube may be mounted within the securing flange of the body of the device should suggest themselves to the mechanic upon whom the work of manufacturing the invention may devolve, in view of the disclosure. An obvious expedient is to construct the body and consequently the flange of malleable metal such as brass or the like and to form the flange initially of sufficient diameter to permit the insertion of the tube therein with ease, whereupon the free edge of the flange may be crimped or otherwise bent inwardly to a slight extent, just sufficient to secure the tube against lateral movement. The tube may be cemented within the flange if necessary to prevent circumferential movement of the same.

What is claimed is:

1. The combination with a level stock, of a level device comprising a flat body adapted to be positioned against one side face of the stock, means for securing the body detachably to the stock, a holding member mounted upon the outer face of the body medially thereof for movement parallel to the plane of the face of the body, and a magnetic compass hinged to one terminal of the holding member and adapted to be swung to a position at right angles to the flat body for obtaining latitude in leveling operations.

2. The combination with a level stock, of a level device having a flat body adapted to be positioned against one side face of the stock, means for securing the body detachably to the stock, a holding member mounted upon the outer face of the body medially thereof for movement in a plane parallel to the face of the body, a magnetic compass hinged to one terminal of the holding member and adapted to be swung outwardly of and to a position at right angles to the flat body for obtaining latitude in leveling operations, and means for retaining the holding member in the latter mentioned position.

In testimony whereof I affix my signature in presence of two witnesses.

JOSEPH F. ISOM.

Witnesses:
S. B. OWENS,
J. C. FRASER.